US009765954B2

(12) United States Patent
Zaderej et al.

(10) Patent No.: US 9,765,954 B2
(45) Date of Patent: Sep. 19, 2017

(54) LED LAMP FIXTURE HAVING DUAL SIDE POWER RAIL AND MAGNETIC COUPLING

(71) Applicant: Molex, LLC, Lisle, IL (US)

(72) Inventors: Victor Zaderej, Wheaton, IL (US); Timothy Canzano, Glen Ellyn, IL (US)

(73) Assignee: Molex, LLC, Lisle, IL (US)

( * ) Notice: Subject to any disclaimer, the term of this patent is extended or adjusted under 35 U.S.C. 154(b) by 36 days.

(21) Appl. No.: 14/443,677

(22) PCT Filed: Nov. 20, 2013

(86) PCT No.: PCT/US2013/071028
§ 371 (c)(1),
(2) Date: May 19, 2015

(87) PCT Pub. No.: WO2014/081842
PCT Pub. Date: May 30, 2014

(65) Prior Publication Data

US 2015/0300613 A1 Oct. 22, 2015

Related U.S. Application Data

(60) Provisional application No. 61/728,615, filed on Nov. 20, 2012.

(51) Int. Cl.

*H02G 5/02* (2006.01)
*H01R 25/14* (2006.01)
*F21V 21/35* (2006.01)
*F21S 6/00* (2006.01)
*F21V 21/096* (2006.01)
*F21V 23/00* (2015.01)
*F21Y 115/10* (2016.01)

(52) U.S. Cl.

CPC .............. *F21V 21/35* (2013.01); *F21S 6/003* (2013.01); *F21V 21/096* (2013.01); *F21V 23/00* (2013.01); *F21Y 2115/10* (2016.08)

(58) Field of Classification Search

CPC .................................. H02G 5/02; H01R 25/14
See application file for complete search history.

(56) References Cited

U.S. PATENT DOCUMENTS 3,341,702 A * 9/1967 Neumann ............... F21S 6/003 362/269
5,154,509 A * 10/1992 Wulfman .............. F21V 21/096 362/227
6,716,042 B2 * 4/2004 Lin ........................ H01R 25/14 362/147
(Continued)

FOREIGN PATENT DOCUMENTS

JP 2009-140669 A 6/2009
JP 2012-048944 A 3/2012
(Continued)

*Primary Examiner* — Ismael Negron
(74) *Attorney, Agent, or Firm* — Clarence R. Moon

(57) ABSTRACT

A luminaire includes a rail, first and second pairs of wings formed at opposed edges of the rail, a pair of contacts on each one of the top and bottom surfaces of the rail, at least one LED module attachable to the rail via at least one magnetic element, such that the LED module is electrically coupled to one pair of the pairs of contacts. The rail configured to receive and power the at least one LED module on either one of the top and bottom surfaces.

6 Claims, 14 Drawing Sheets

(56) References Cited

U.S. PATENT DOCUMENTS

| | | | | |
|---|---|---|---|---|
| 6,776,496 | B2 * | 8/2004 | Cok | F21K 9/00 362/414 |
| 7,503,778 | B2 * | 3/2009 | Lehman | F21V 21/35 362/147 |
| 7,726,974 | B2 * | 6/2010 | Shah | H05B 33/0803 439/40 |
| 8,172,429 | B2 * | 5/2012 | Ko | F21S 6/003 362/217.02 |
| 8,348,492 | B2 * | 1/2013 | Mier-Langner | F21V 21/096 362/147 |
| 8,651,711 | B2 * | 2/2014 | Rudisill | F21V 29/70 362/249.02 |
| 8,680,774 | B2 * | 3/2014 | Van Hoof | H05B 33/0845 315/209 R |
| 9,109,791 | B2 * | 8/2015 | Lin | F21V 33/0052 |
| 9,301,416 | B2 * | 3/2016 | Zaderej | F21S 2/005 |
| 2008/0212324 | A1 * | 9/2008 | Lin | F21S 6/003 362/287 |

FOREIGN PATENT DOCUMENTS

| | | | |
|---|---|---|---|
| KR | 10-2007-0119128 | A | 12/2007 |
| KR | 10-1024430 | B1 | 3/2011 |
| WO | WO 2012-030536 | A2 | 3/2012 |

* cited by examiner

LED LAMP FIXTURE HAVING DUAL SIDE POWER RAIL AND MAGNETIC COUPLING

RELATED APPLICATIONS

This application claims priority to U.S. Provisional Application No. 61/728,615, filed Nov. 20, 2012, which is incorporated herein by reference in its entirety.

FIELD OF THE INVENTION

The present invention relates to field of luminaires, more specifically to the field of luminaires suitable for use with LED modules.

DESCRIPTION OF RELATED ART

Desktop luminaires are well known and have been used as a way to illuminate an area, typically the area on a desk (or table or the like). One issue with existing luminaires is that they tend to be relatively inflexible in their output. Typically about the most that can be accomplished with an existing luminaire is that it can be dimmed. Light emitting diodes (LED) based light sources have become more popular but most attempts to use LEDs have been based on attempting to package an LED bulb in a traditional luminaire. This can be accomplished but traditional luminaires were designed and intended to be used with incandescent bulbs and thus are not well optimized for use with LED-based modules. Consequentially, further improvements in lamps (and related fixtures) would be appreciated by certain individuals.

BRIEF SUMMARY

A fixture includes a rail with wings so as to provide an I-beam like shape. Powered contacts can extend along upper and lower surfaces of the rail. Modules are configured to be mated to the rail so as to be energized by the powered contacts. The modules can include a side configuration to facilitate moving of the module. The rail can be configured to provide powered contacts along a top surface and a bottom surface.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
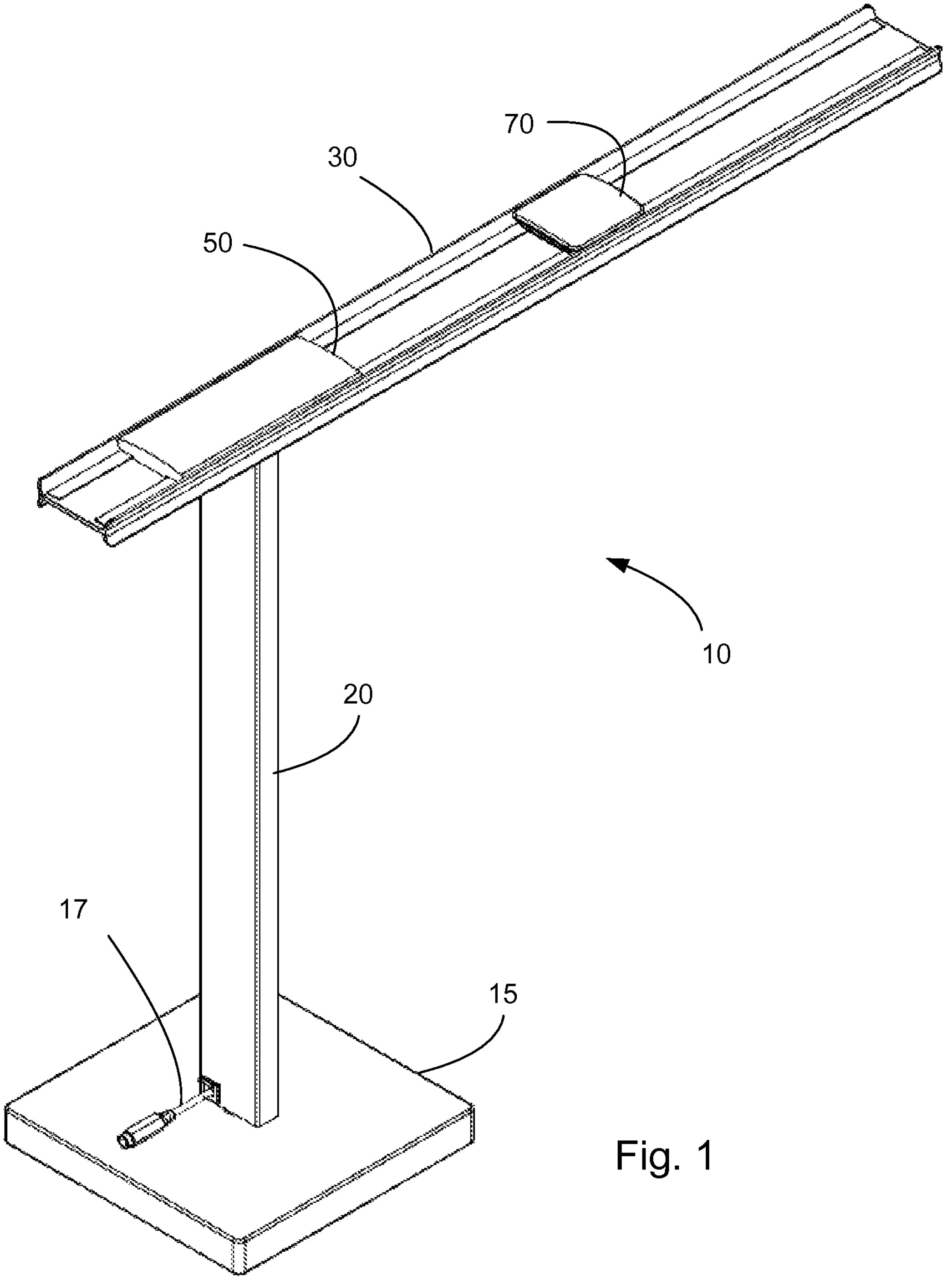
FIG. 1 is a perspective view of an embodiment of a lamp fixture and an LED module supported by the lamp fixture.
Figure 2:
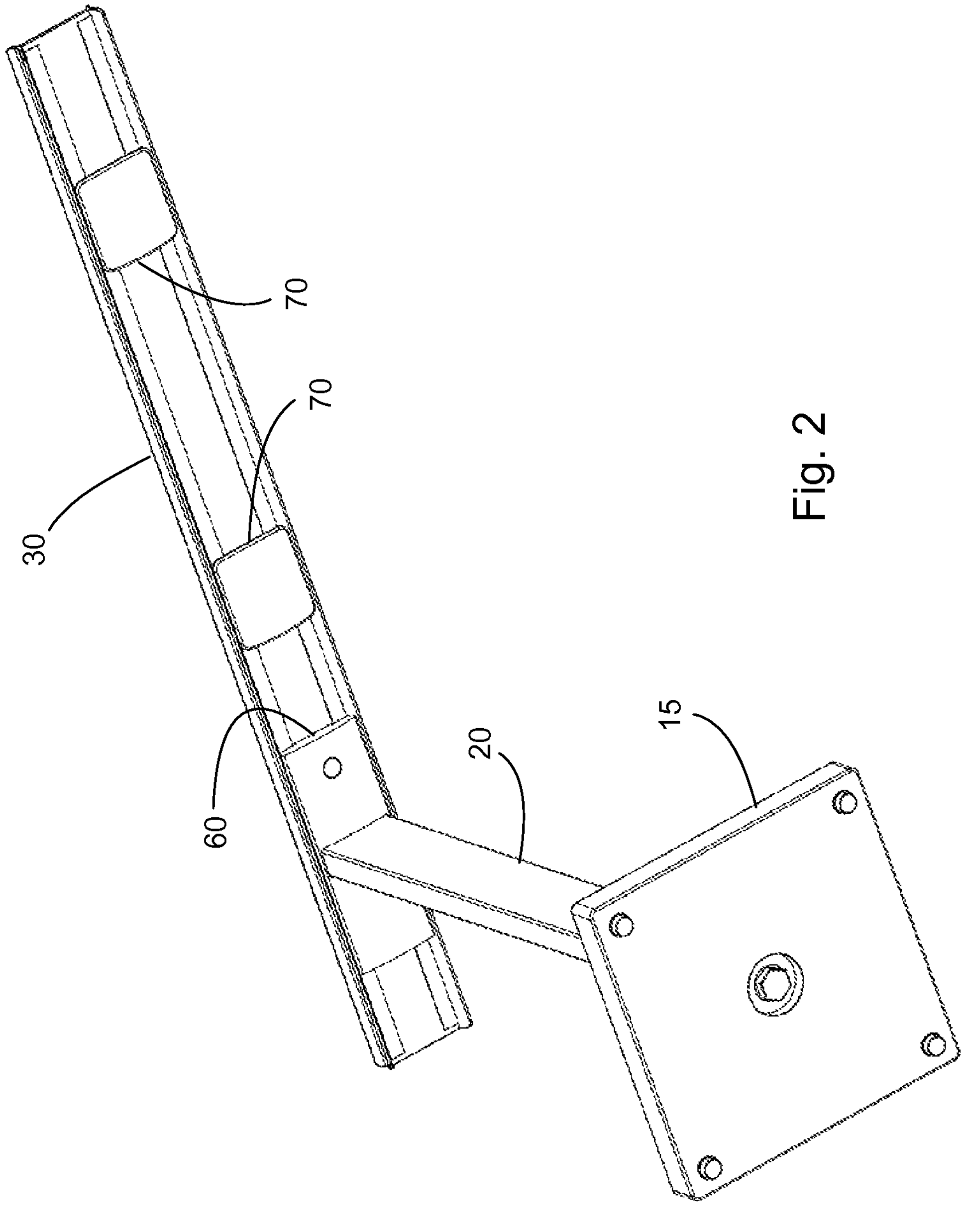
FIG. 2 is another perspective view of the embodiment depicted in FIG. 1.
Figure 3:
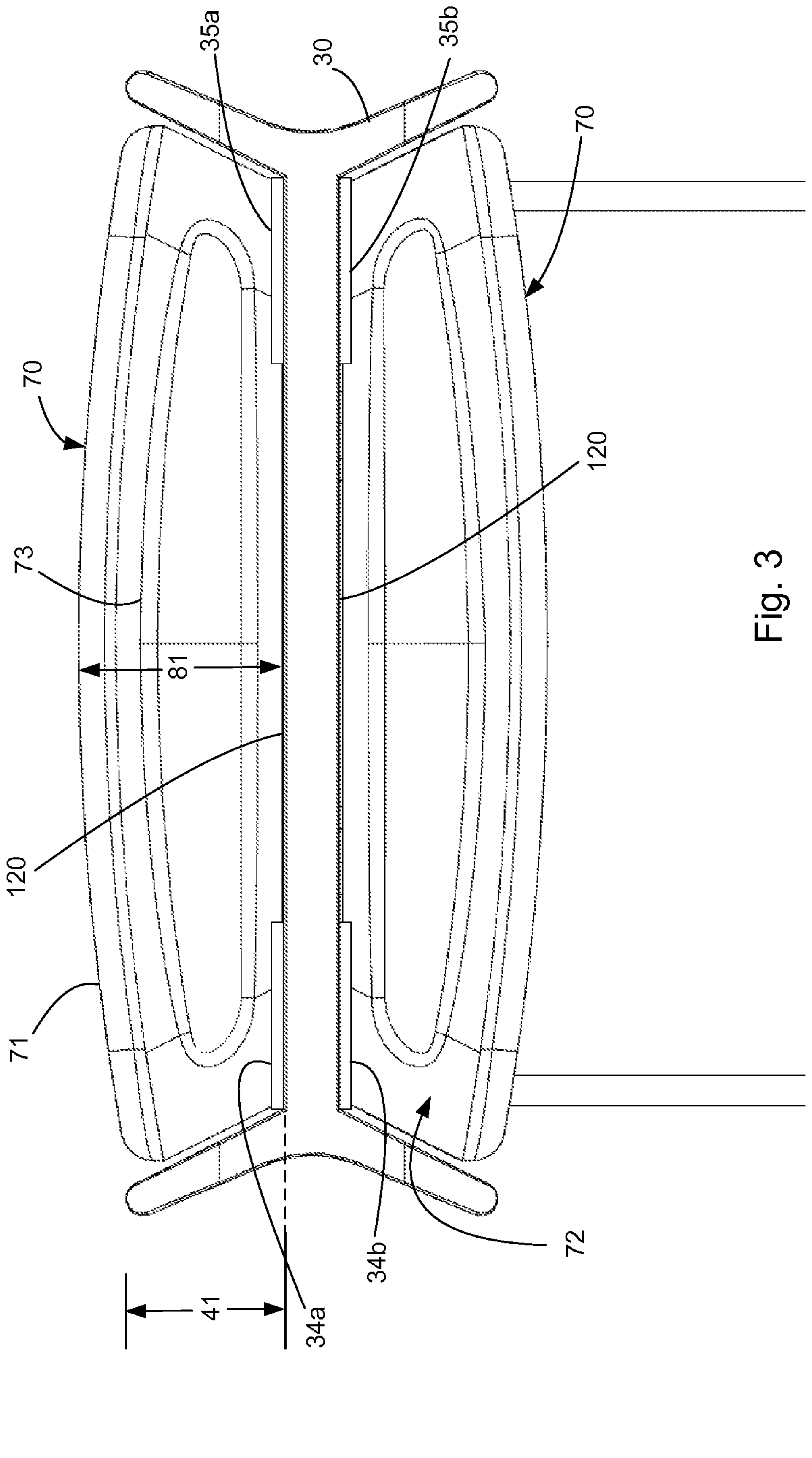
FIG. 3 is an elevated side view of the embodiment depicted in FIG. 1.
Figure 4:
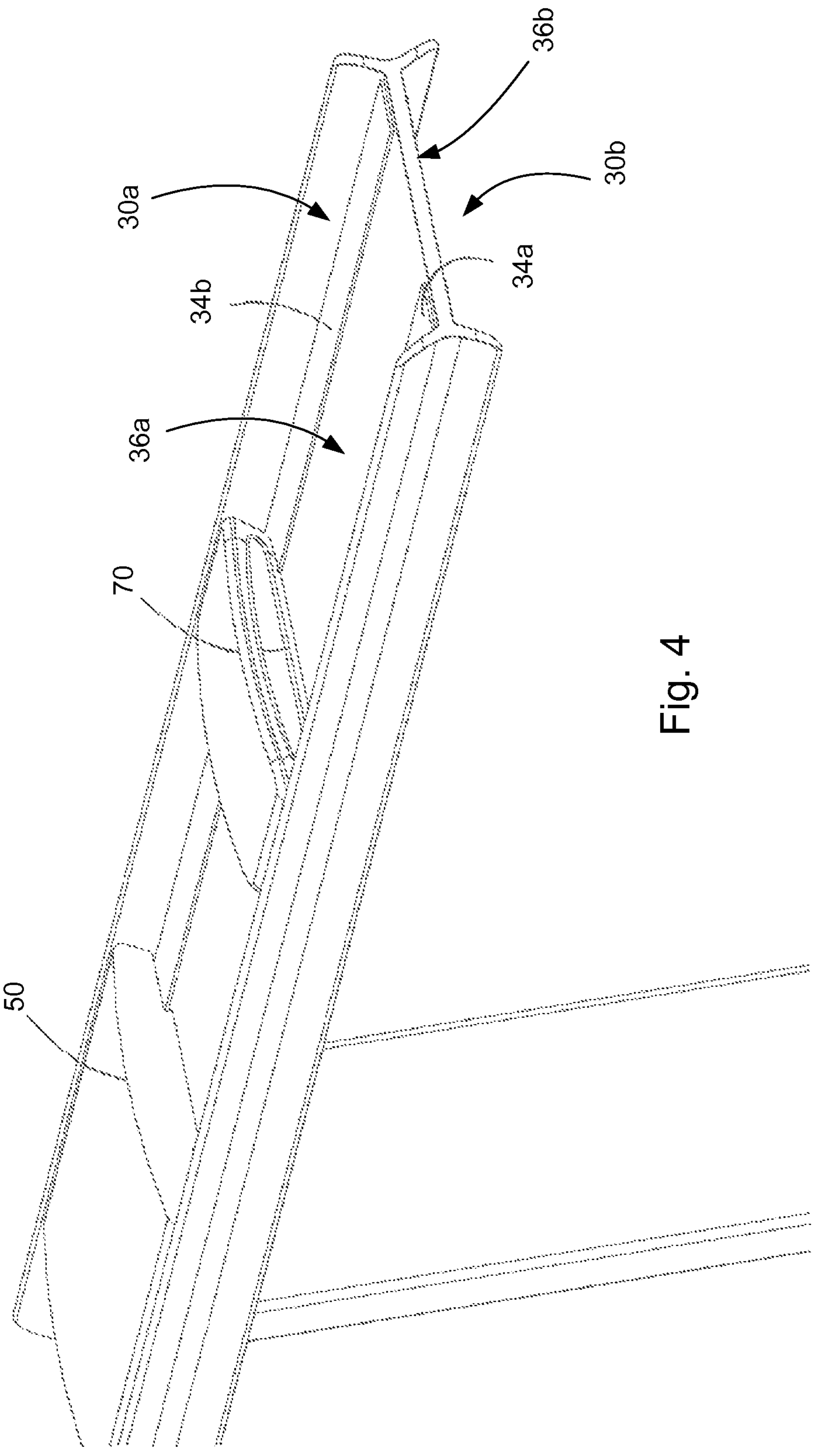
FIG. 4 is another perspective view of the embodiment depicted in FIG. 1.
Figure 5:
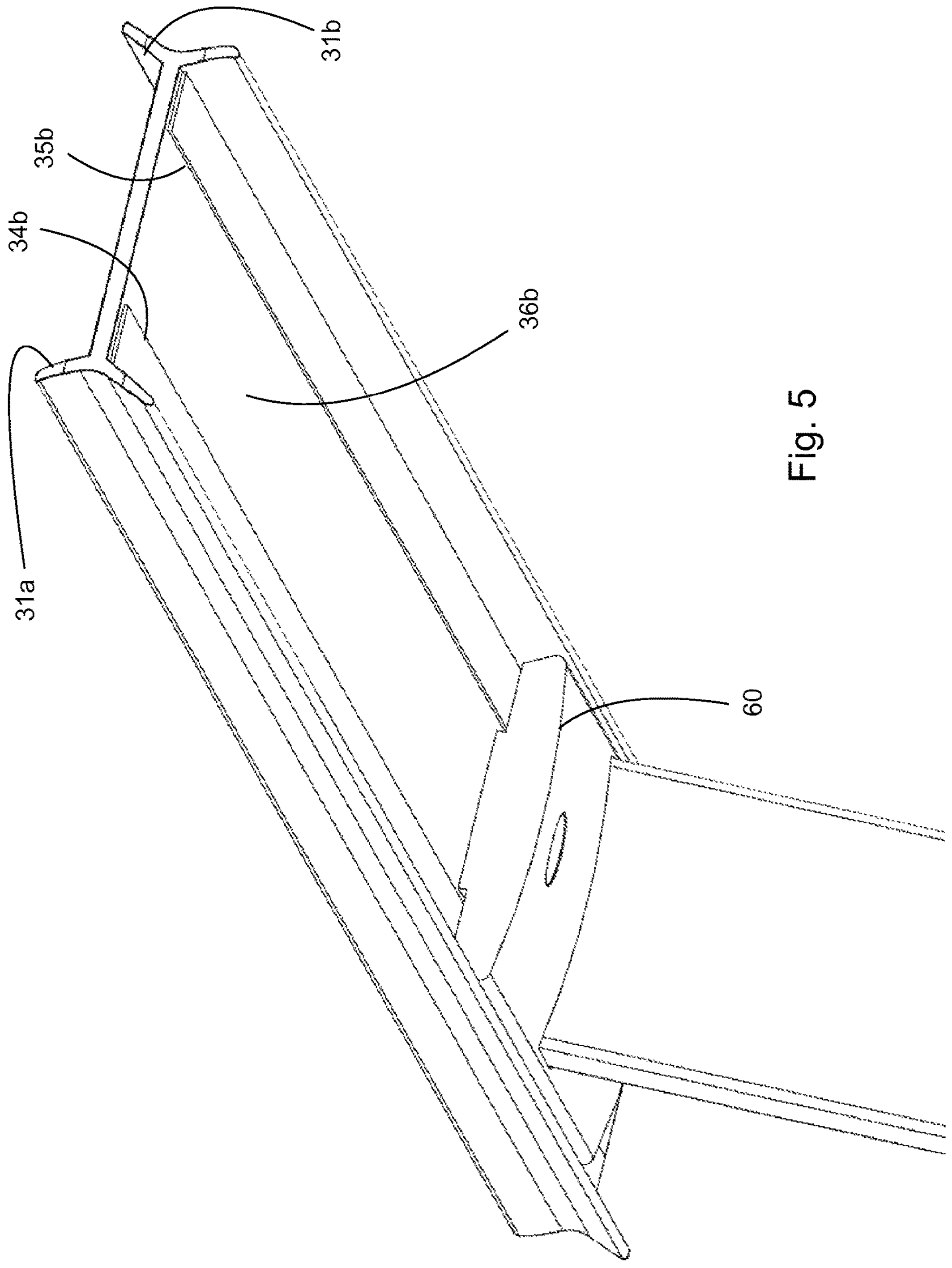
FIG. 5 is a perspective view of an underside of an embodiment of a rail suitable for use in a lamp fixture.
Figure 6:
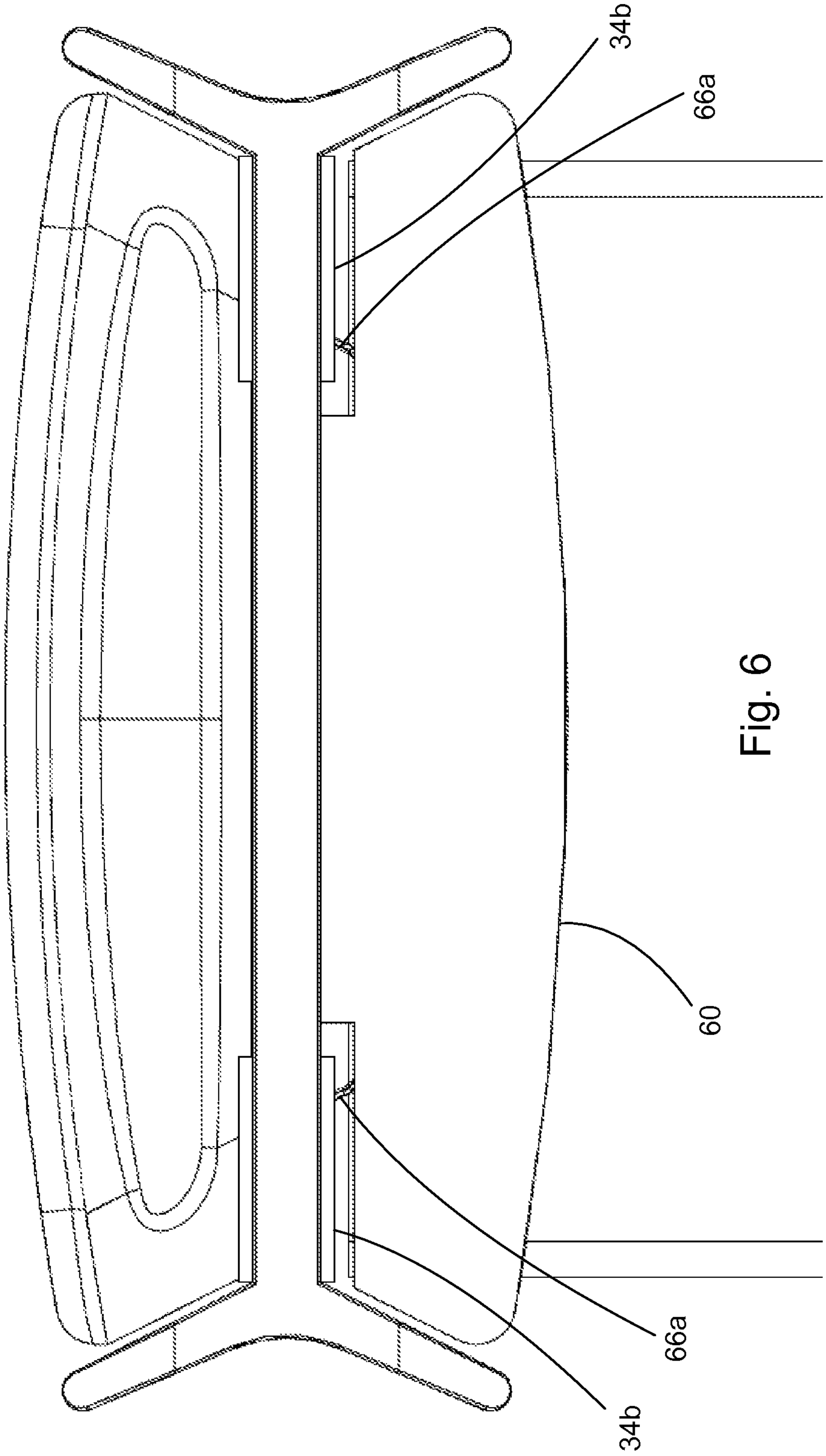
FIG. 6 is an elevated side view of the embodiment depicted in FIG. 5.
Figure 7:
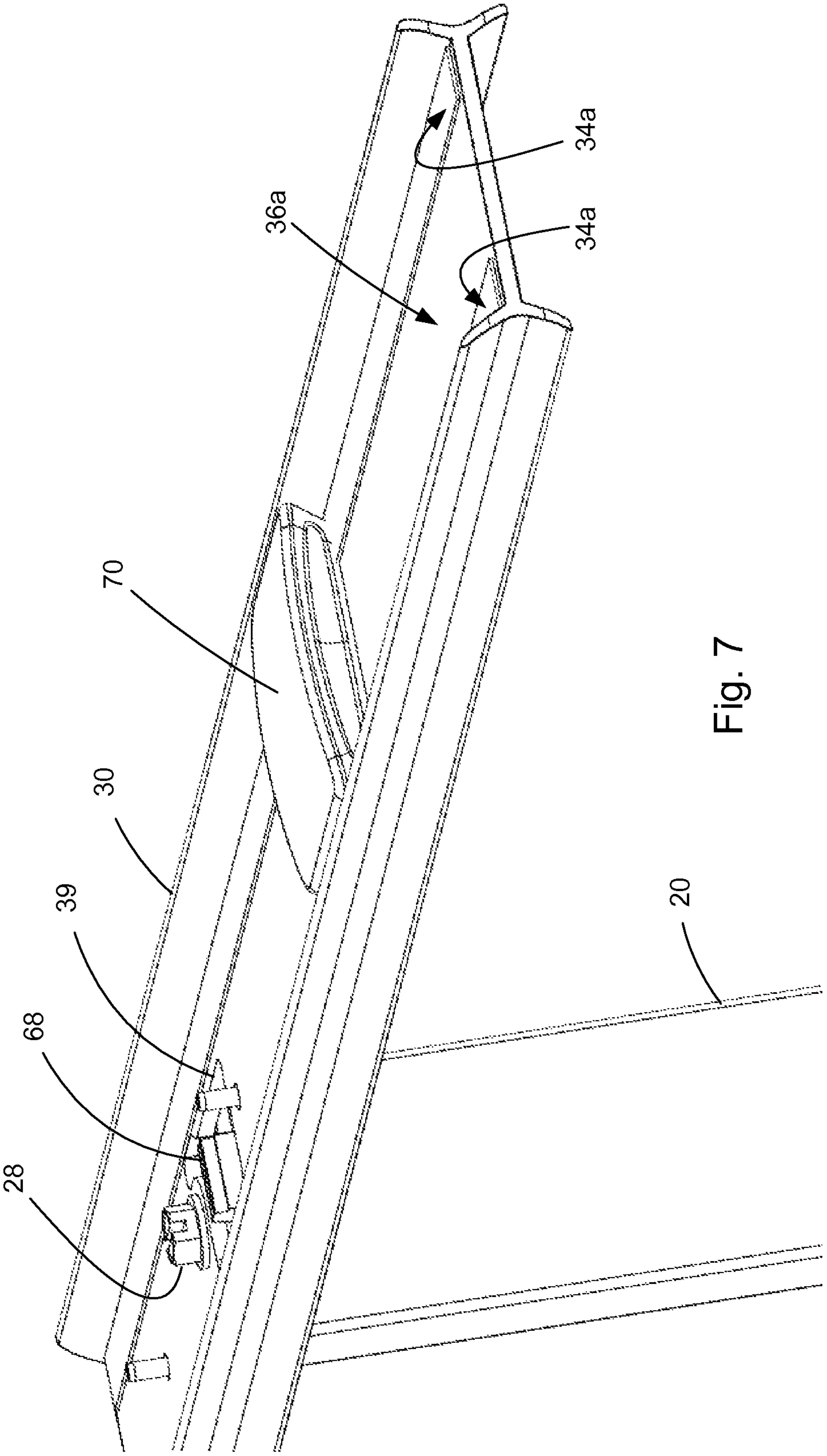
FIG. 7 is a simplified perspective view of the embodiment depicted in FIG. 4.
Figure 8:
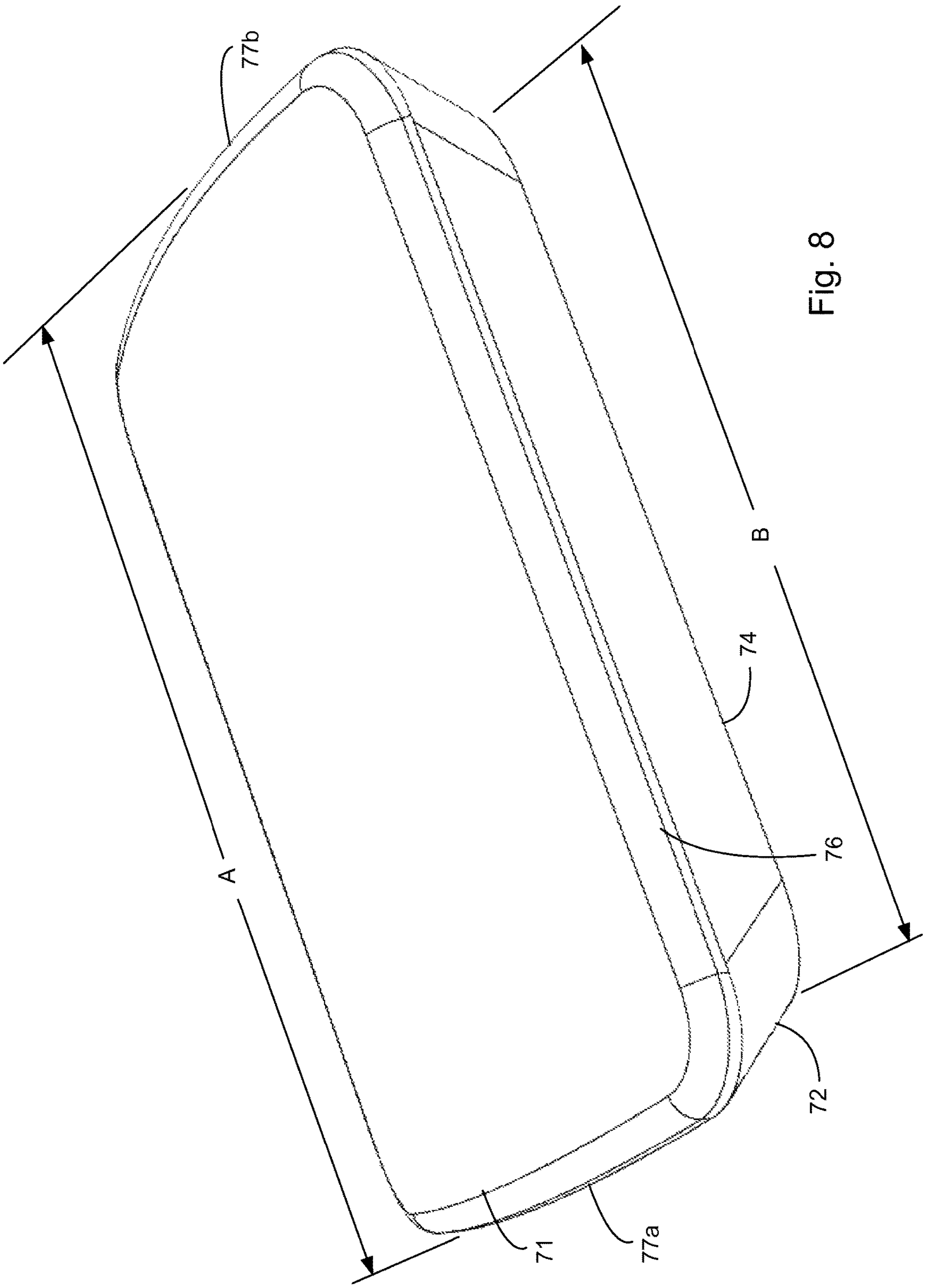
FIG. 8 is a perspective view of an embodiment of an LED module.
Figure 9:
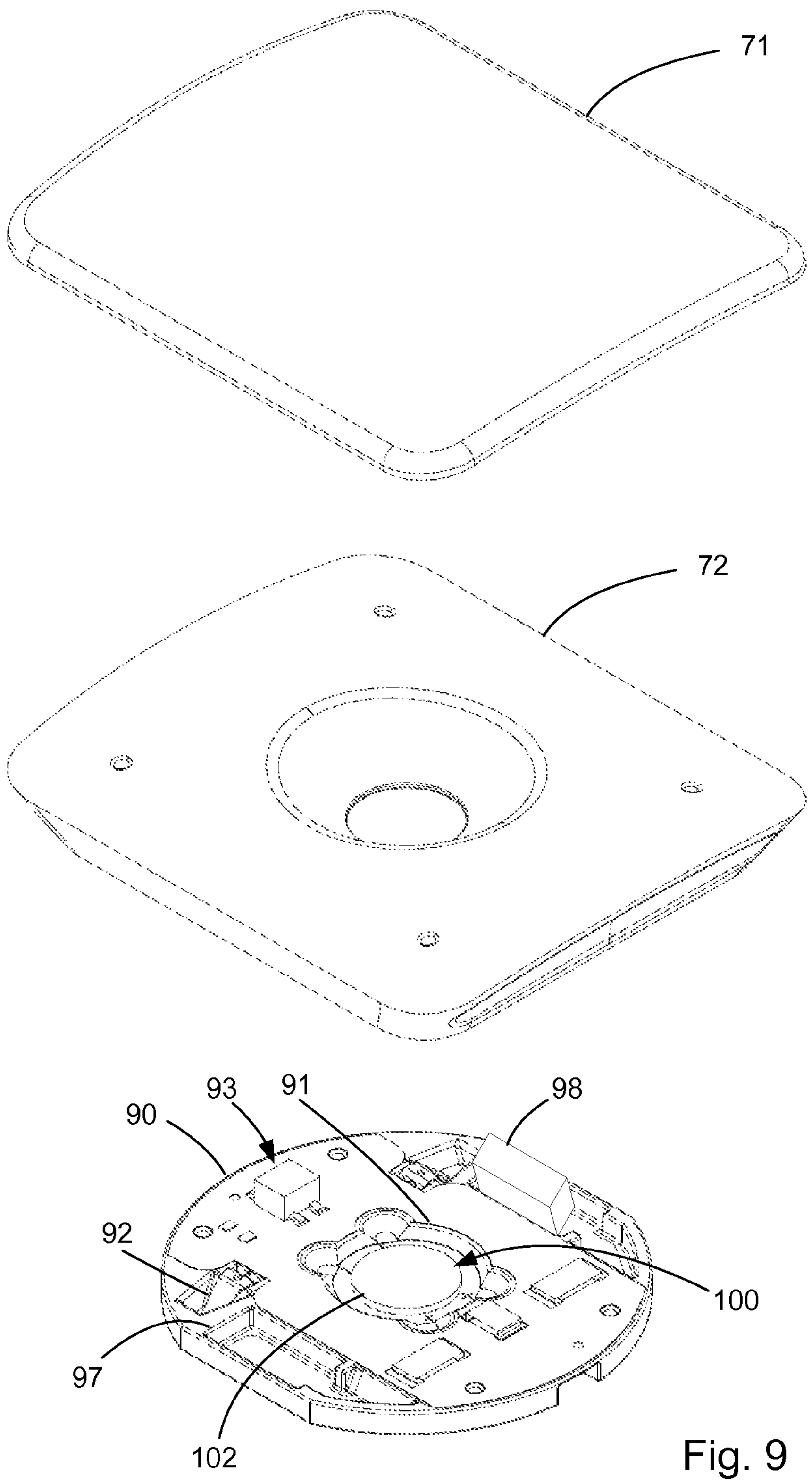
FIG. 9 is an exploded perspective view of an embodiment of an LED module.
Figure 10:
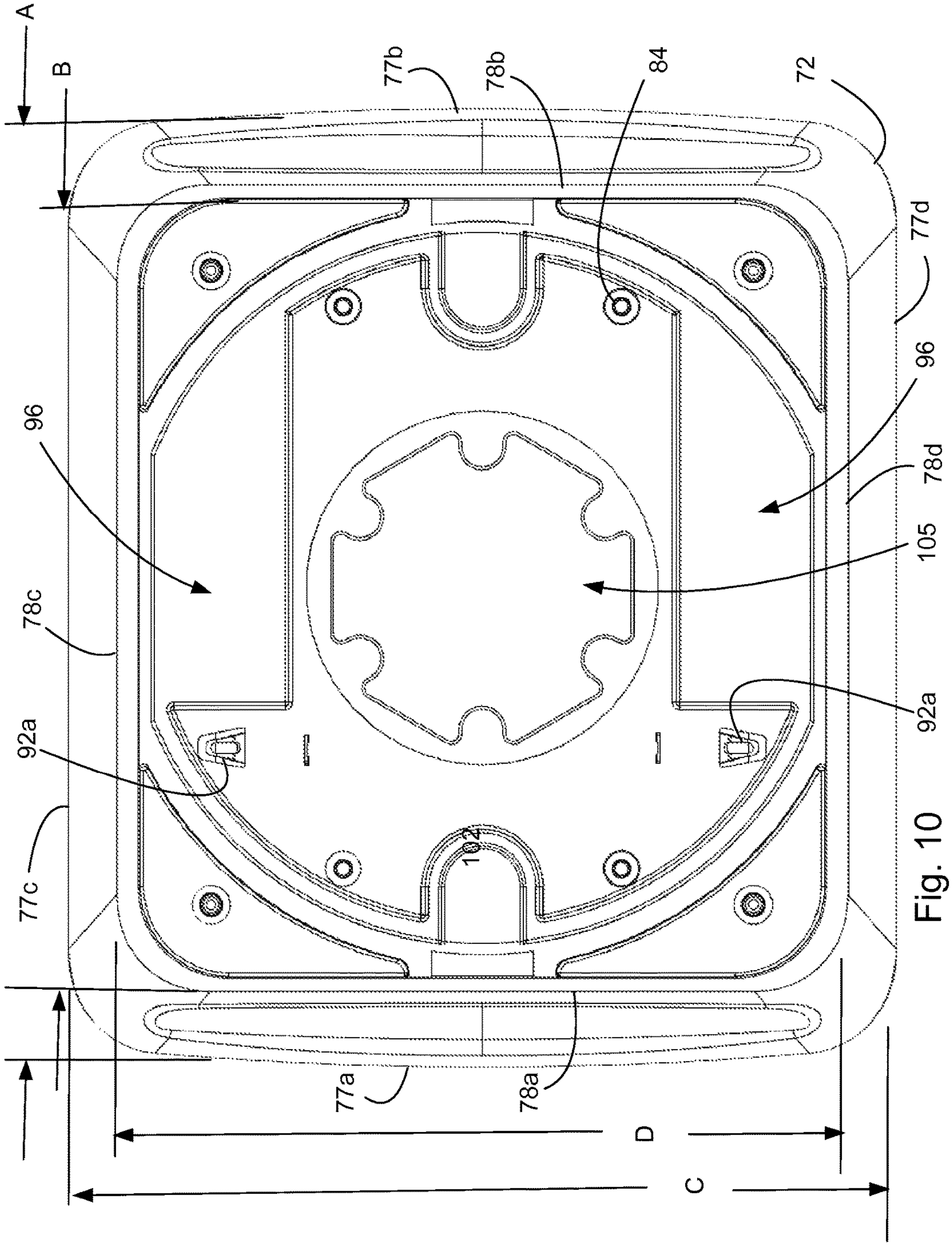
FIG. 10 is a bottom view of an embodiment of an LED module
Figure 11:
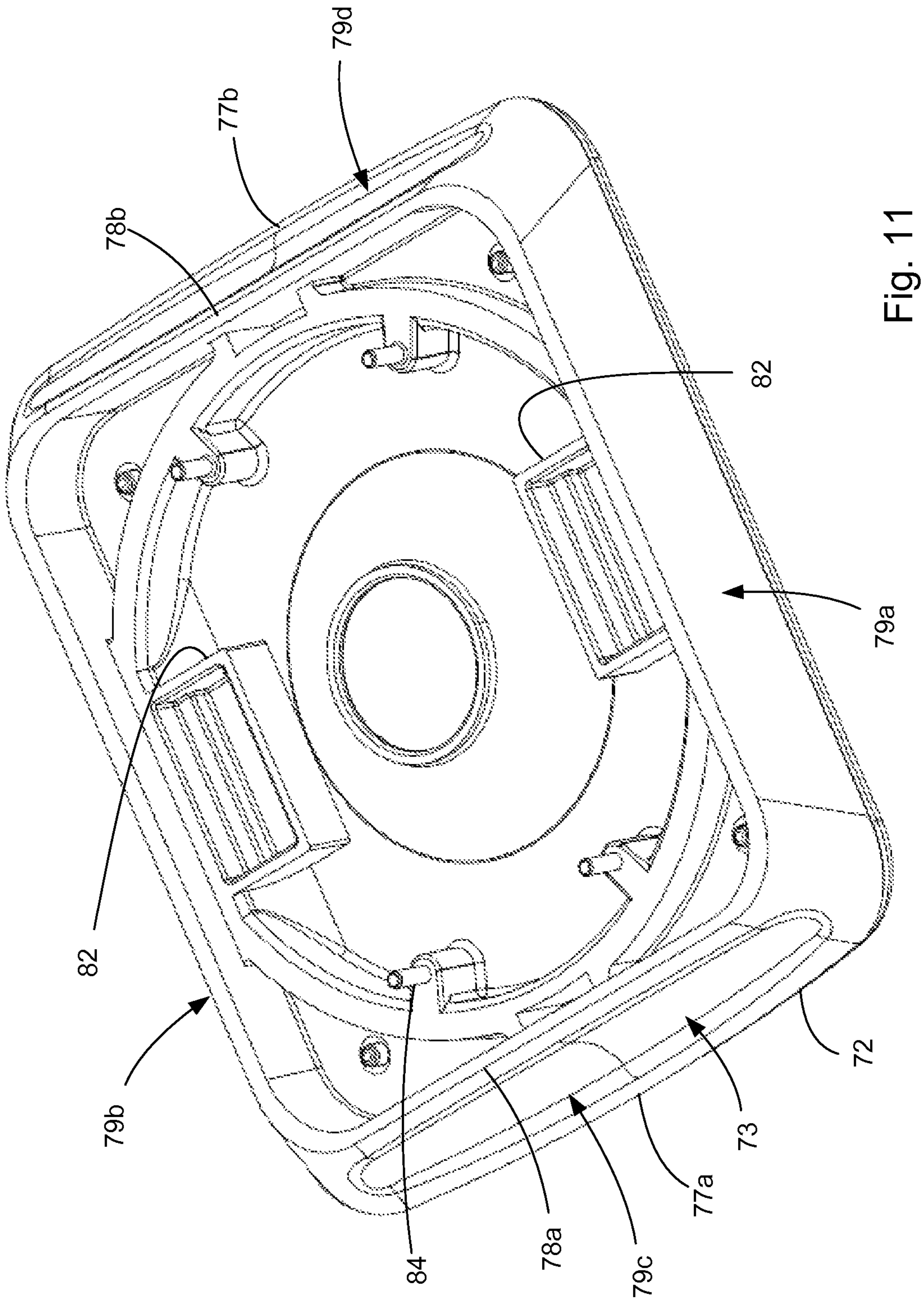
FIG. 11 is a perspective view of an underside of an embodiment of a housing suitable for use with an LED module.
Figure 12:
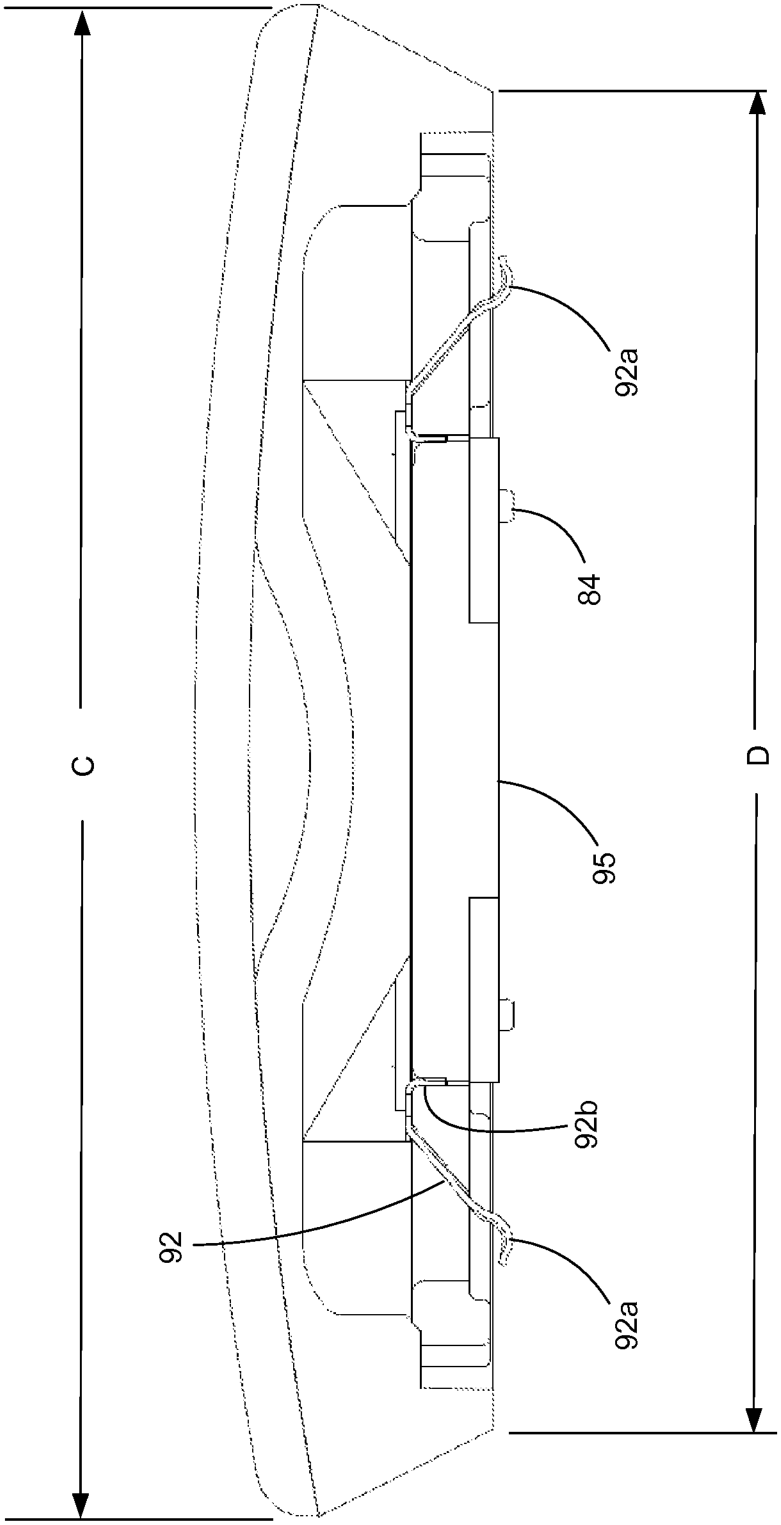
FIG. 12 is an elevated side view of a cross section of an embodiment of an LED module.
Figure 13:
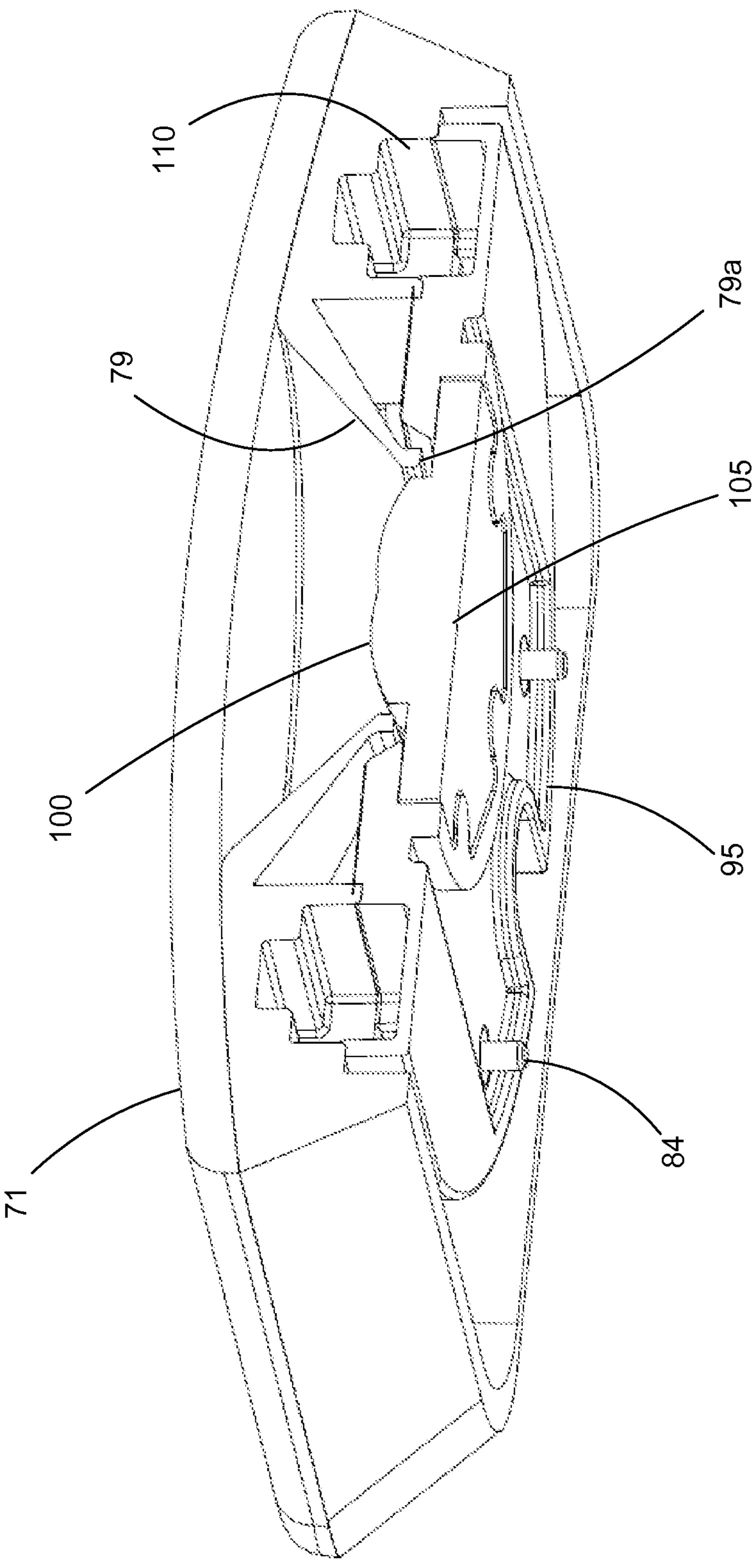
FIG. 13 is a perspective view of a cross section of an embodiment of an LED module.

The detailed description that follows describes exemplary embodiments and is not intended to be limited to the expressly disclosed combination(s). Therefore, unless otherwise noted, features disclosed herein may be combined together to form additional combinations that were not otherwise shown for purposes of brevity.

FIGS. 1-14 illustrate features of a luminaire 10 and an LED module 70 suitable for use therewith, the luminaire configured to use on a desktop. Convention luminaires often include a reflector that helps focus the light downward. As can be appreciated, the depicted LED module 70 can include an internal reflector (and/or lens) to help shape the emitted light and thus the luminaire does not need a reflector. Furthermore, due to the flexibility provided by rail 30, the placement of the LED module 70 can be varied as desired. Furthermore, as the rail has powered contacts 34*a*, 35*a* and 34*b*, 35*b* on a top surface 36*a* and bottom surface 36*b*, respectively, the LED modules 70 can be positioned so as to direct light up and/or down. This allows a wide range of potential illumination patterns. With three LED modules, for example, the system can be modified from three LED modules facing downward (to provide a high level of illumination on the supporting surface) to three LED modules facing upward so as to provide a more room-wide illumination effect. Naturally, combinations of one up, two down and two up, one down are also possible.

Furthermore, if different LED modules are configured to emit light with different colors then a number of interesting decorative effects are possible. This provides a luminaire with greater flexibility that previously was possible. For example, patriotic colors could be used in combination with regular lights so as to provide a luminaire that was both functional and made a statement. Other applications include light colors that are based on holidays and the like. And with the use of dual-colored lenses it would be possible to further increase the potential illumination effects. Variations in light output in each LED module can also be used to provide further variations in the illumination effect.

Turning to details depicted in the figures, a luminaire 10 includes a base 15 with a vertical member 20 and a power cord 17. Conductors, not shown, can extend internally up the vertical member 20 to provide power to a rail 30. The vertical member 20 supports the rail 30 and a first cap 50 and a second cap 60 are configured to cover up the connection between the rail 30 and the vertical member 20. In an embodiment, a connector 68 can be provided to connect the conductors to the conductive members provided by the first cap 50. While the vertical member extends upward from the base 15 (as the luminaire is configured so that the base can rest on a surface such as a desk or table), it should be noted that the vertical member could also extend above the rail 30 if desired (although the aesthetics of such a configuration would likely be inferior to the depicted design). Furthermore, the use of more than one vertical member is possible and the vertical member could extend downward to the rail. Thus, a suspended luminaire version is also contemplated.

As can be appreciated, the rail 30 includes wings 31*a*, 31*b* that are positioned on opposite sides of surfaces 36*a*, 36*b* of the respective upper channel 30*a* and lower channel 30*b*. Powered contacts 34*a*, 34*b*, 35*a* and 35*b* are positioned in each channel and in an embodiment can be steel plated with a protective coating and can be adhered to the respective surface 36*a*, 36*b* with an insulating adhesive layer. Power is provided to the first and second caps 50, 60 and terminals supported by the caps (such as terminals 66*a*, which would be provided on both the first and second caps 50, 60) are electrically connected to the powered contacts 34*a*, 34*b*, 35*a* and 35*b*. As can be appreciated, an aperture 39 in the rail allows mating connectors 68 to electrically connect the first and second caps together (thus electrically connecting the powered contacts on both the upper and lower surfaces of the rail).

As depicted, the LED modules 70 are magnetically coupled to the rail 30. In an embodiment, the powered contacts 34*a*-35*b* can be formed of a ferrite-based material so as to allow for magnets 98 supported by the LED module 70 to be attracted to the powered contacts 34*a*-35*b*. This will allow terminals 92 supported by the LED module 70 to be electrically connected to the powered contacts 34*a*-35*b*.

As can be appreciated, the depicted LED module 70 has a main body 72 configured for gripping. In an embodiment, the main body 72 has sides 79*a*-79*d* and each side has an upper edge 77*a*-77*d* and a lower edge 78*a*-78*d*. In an embodiment, a distance A between upper edges 77*a*, 77*b* is greater than a distance B between lower edges 78*a* and 78*b*. Similarly, a distance C between upper edges 77*c* and 77*d* can be greater than a distance D between lower edges 78*c* and 78*d*. Thus, the sides 79*a*-79*d* can present an angled or tapered profile on all four sides. It should be noted that the particular ratio of A to B and C to D can be adjusted depending on aesthetic considerations but there is a benefit to having the surface area defined by distances B and D being less than a surface area defined by distances A and C as it helps keep the base 90 smaller. In addition, a benefit of having B less than A is that it has been determined such a configuration is useful for handling the LED module 70 as the resultant taper provides by sides 79*a*, 79*b* makes it easier to remove the LED module 70 from the rail 30. It should be noted, however, that the depicted angle in the sides 79*a*-79*d* of the LED module was selected for aesthetic reasons and a wide range of angles can be provided. To further improve the handling characteristics, a recess 73 can be provided on sides 79*a*, 79*b*. As can be appreciated, the actual shape of recess 73 was selected for aesthetic reasons and can varied as desired, thus the depicted recess 73 configuration is not intended to be limiting.

It should be noted that while it is desirable to have two opposing sides have angled sides to facilitate holding the module, in an alternative embodiment just one side 79*c* or 79*d* could be angled inwardly. Of course, the angle of the side might be different than what is depicted but, as can be appreciated, even having one angled side can provide noticeable assistance in aiding the removal of the LED module from the rail. Naturally, to obtain the full benefits of the improvements in handling, one of the sides that is not going to be facing the wings 31*a*-31*b* should have the angled side (e.g., side 79*c* or 79*d* in the depicted configuration). The depicted LED module 70 is rectangular in shape and that is helpful in ensuring the LED module 70 is positioned correctly in the rail. While LEDs are directional and thus don't work when facing an inverted current, the inclusion of a bridge rectifier in the LED module can help mitigate potential polarity issues.

The depicted LED module 70 includes a cover 71 that can function as a lens if desired and can be heat stacked to the main body 72. The main body 72 includes an upper pocket 82 and a reflector 79 that is configured to direct light from an LED engine 100 that includes phosphor block 102 over a plurality of LEDs mounted on a substrate 105. A base 90 attaches to the main body 72 and be secured in position with stakes 84 (that can be heat staked), although other conventional fastening systems can also be used if desired. A thermal interface 120 can then be applied to a lower side of the base 90 so as to provide thermal coupling between the LED engine 100 and the resulting rail 30 surface. It should be noted that the LED engine 100 is a chip-on-board (COB) style LED and any similar suitable configuration, including LED engine designs with remote phosphor blocks, could be used. The substrate 105 is positioned in a recess in the base 90 that includes a lower pocket 97 that, together with the upper pocket 82, forms a magnet box 110. The base further supports terminals 92 that are configured with a mating contact 92*a* and a tail 92*b*. The terminals 92 electrically connect components 93 (and the LED engine 100) to the powered contacts 34*a*-35*b*. As can be appreciated, the components 93 can include resistors, capacitors, controllers (including wireless controllers that are separately addressable), bridge rectifiers drivers and other known components that are useful to provide a desired energy input to the LED engine 100. Thus, the LED module can configured to include a driver that coverts lower voltage AC to DC or it can be configured to provide constant current based on an input voltage. In an embodiment the LED engine can be attached directly to the base 90 via solder attach and in an embodiment the LED engine and the components can be mated together via a single soldering operation (e.g., by running the components through a solder oven). It should be noted that the base 90 can be formed of an LCP material with traces provided on the surface (e.g., using a laser direct structuring or LDS technology).

Figure 14:
FIG. 14 is a schematic representation of an embodiment of a component arrangement in a lamp fixture and an LED module system.

As can be appreciated from the schematic representation of FIG. 14, the LED engine 100 is supported on a substrate 105 (these components are typically provided as part of a COB LED) and uses the thermal interface 120 between the substrate 105 and surface 36*a* of the rail 30 to ensure there is a reliable and suitable thermal connection to the surface 36*a* (or surface 36*b* if the LED module is positioned on a bottom side) of the rail 30. The thermal interface 120 can be a thermally conductive compressive pad that allows the magnets 98 to compresses the thermal interface 120 when the LED module 70 is placed on the rail 30 so that the thermal junction between the substrate and the surface 36*a* has a low thermal resistance. The magnets 98 also cause the terminals 92 to deflect, thus ensuring there is a good electrical connection to the powered contacts 34*a*-35*b*.

It should be noted that one potential issue with the depicted rail design is that the number of LED modules placed on the rail might cause the thermal load to exceed the recommended design level. For example, a particular rail might be configured and sized so that it can dissipate 25 watts in a 22 C room while maintaining a temperature below 40 C. If each LED module is configured to output 6 watts, then placing 5 modules on the rail could potentially exceed the thermal dissipation capability of the rail. To avoid potential issues with thermal load, a resistor can be provided in series with the power contacts 34*a*-35*b* and the resister can be used to help limit the amount of power that is delivered to the rail by decreasing the voltage as addition modules are added (as additional current draw will increase the voltage drop provided by the resistor). In other words, the fixture 10 can be configured so that increasing the number of LED modules will decrease the amount of power used by each individual LED module, thus ensuring that the total number of watts used by the LED modules does not exceed the thermal limits of the rail. As it is difficult to perceive small drops in illumination, the resistor can be sized so that there negligible impact for some desired number of modules and the addition of additional modules will decrease the amount of light emitted by each module in a more perceptable manner.

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

We claim:

1. A luminaire, comprising:

a rail with a first pair of wings and a second pair of wings, the rail having an upper surface and a lower surface positioned between the first and second pairs of wings, a vertical member supporting the rail;

a first pair of powered contacts secured to the upper surface, the first pair of contacts electrically isolated from the upper surface; and a second pair of powered contacts secured to the lower surface, the second pair of contacts electrically isolated from the lower surface, wherein the first and second pair of powered contacts are electrically connected together and provided power through the vertical member;

a first cap positioned on the first surface and a second cap positioned on the second surface, the first and second cap electrically connected together via an aperture in the rail; and wherein a first LED module is electrically connected to the first pair of powered contacts.

2. The luminaire of claim 1, wherein the powered contacts are ferrite based and are electrically isolated from the rail by an insulative adhesive.

3. The luminaire of claim 1, further comprising a second LED module electrically connected to the second pair of powered contacts.

4. The luminaire of claim 3, wherein the first and second LED module are in a parallel circuit.

5. The luminaire of claim 1, wherein the first and second pair of powered contacts are electrically connected together in a parallel circuit.

6. The luminaire of claim 5, wherein the luminaire includes a resister positioned in series with the power contacts.

* * * * *